US008863604B2

(12) United States Patent
Müller

(10) Patent No.: US 8,863,604 B2
(45) Date of Patent: Oct. 21, 2014

(54) DRIVE UNIT FOR ENTRANCE AND EXIT SYSTEMS

(75) Inventor: Dirk Müller, Kaufungen (DE)

(73) Assignee: Gebr. Bode GmbH & Co. KG (DE)

( * ) Notice: Subject to any disclaimer, the term of this patent is extended or adjusted under 35 U.S.C. 154(b) by 870 days.

(21) Appl. No.: 12/443,570

(22) PCT Filed: Sep. 21, 2007

(86) PCT No.: PCT/EP2007/060066
§ 371 (c)(1),
(2), (4) Date: Jun. 29, 2009

(87) PCT Pub. No.: WO2008/037669
PCT Pub. Date: Apr. 3, 2008

(65) Prior Publication Data
US 2009/0255358 A1 Oct. 15, 2009

(30) Foreign Application Priority Data
Sep. 28, 2006 (DE) ..................... 20 2006 014 936 U

(51) Int. Cl.
*B60K 20/00* (2006.01)
*H02H 7/08* (2006.01)
*E05F 15/10* (2006.01)
*B61D 19/02* (2006.01)
*E05F 15/12* (2006.01)

(52) U.S. Cl.
CPC ........... *E05F 15/10* (2013.01); *E05Y 2201/246* (2013.01); *E05Y 2201/266* (2013.01); *E05Y 2201/216* (2013.01); *E05Y 2800/25* (2013.01); *E05Y 2800/11* (2013.01); *E05Y 2201/21* (2013.01); *E05Y 2800/264* (2013.01); *B61D 19/023* (2013.01); *E05Y 2201/462* (2013.01); *E05Y 2201/26* (2013.01); *E05Y 2201/72* (2013.01); *E05Y 2201/244* (2013.01); *E05F 15/127* (2013.01); *E05Y 2900/51* (2013.01); *E05Y 2800/262* (2013.01); *E05F 15/121* (2013.01)
USPC .......................................... 74/473.3; 318/446

(58) Field of Classification Search
USPC ........ 74/405, 89, 89.2, 89.26, 606 R; 49/138, 49/324, 362, 360, 358
See application file for complete search history.

(56) References Cited

U.S. PATENT DOCUMENTS 3,530,734 A 9/1970 Wray
3,652,124 A * 3/1972 Tronville .................. 296/146.4

(Continued)

FOREIGN PATENT DOCUMENTS

DE 3504489 A1 8/1986
DE 101 17 933 10/2002

(Continued)

OTHER PUBLICATIONS

Machine Translation of DE 101 17 934, http://worldwide.espacenet.com/.*

(Continued)

*Primary Examiner* — Troy Chambers
*Assistant Examiner* — Jude Agendia
(74) *Attorney, Agent, or Firm* — Cantor Colburn LLP

(57) ABSTRACT

A drive apparatus for boarding and unboarding devices, in particular for passenger doors, boarding ramps, retractable steps and the like on public transport vehicles having an electric drive motor the driven element of which is connected to the input element of a first reduction gear the output element of which is coupled to the actuation devices for the boarding and unboarding devices where the drive apparatus is constructed as a compact drive where the electric drive motor, the first reduction gear and a second reduction gear as well as an energizable clutch are disposed axially behind each other inside a tubular housing between the first reduction gear and the second reduction gear.

13 Claims, 5 Drawing Sheets

(56) References Cited

U.S. PATENT DOCUMENTS

| | | | | |
|---|---|---|---|---|
| 3,859,866 | A * | 1/1975 | De Grazia | 74/512 |
| 4,073,526 | A * | 2/1978 | Sajfert | 292/347 |
| 4,350,384 | A * | 9/1982 | Yasuda | 296/146.4 |
| 4,583,324 | A * | 4/1986 | Storz et al. | 49/367 |
| 4,885,954 | A * | 12/1989 | Wanlass | 356/73.1 |
| 5,138,795 | A * | 8/1992 | Compeau et al. | 49/138 |
| 5,187,933 | A | 2/1993 | Nikolaus | |
| 5,187,993 | A | 2/1993 | Nicholson et al. | |
| 5,531,498 | A * | 7/1996 | Kowall | 296/146.4 |
| 6,283,535 | B1 * | 9/2001 | Yuge | 296/146.8 |
| 6,511,107 | B2 * | 1/2003 | Barczynski et al. | 292/216 |
| 6,516,567 | B1 * | 2/2003 | Stone et al. | 49/343 |
| 6,520,557 | B2 * | 2/2003 | Benthaus et al. | 296/76 |
| 6,964,449 | B2 * | 11/2005 | Takeda et al. | 296/146.4 |
| 7,063,373 | B2 * | 6/2006 | Chikata et al. | 296/146.4 |
| 7,175,228 | B2 * | 2/2007 | Mrkovic et al. | 296/155 |
| 7,248,011 | B2 * | 7/2007 | Schachtl et al. | 318/466 |
| 7,565,087 | B2 * | 7/2009 | Matsusaka et al. | 399/69 |
| 7,566,087 | B2 * | 7/2009 | Hanna et al. | 296/76 |
| 7,866,729 | B2 * | 1/2011 | Porat et al. | 296/146.4 |
| 8,234,817 | B2 * | 8/2012 | Neundorf et al. | 49/280 |
| 2002/0145349 | A1 | 10/2002 | Astengo | |
| 2004/0113456 | A1 | 6/2004 | Greuel et al. | |
| 2005/0235866 | A1 * | 10/2005 | Stojc et al. | 105/343 |
| 2006/0112643 | A1 * | 6/2006 | Yokomori et al. | 49/360 |
| 2007/0137331 | A1 * | 6/2007 | Kachouh | 74/89.23 |
| 2007/0179006 | A1 * | 8/2007 | Kachouh | 475/154 |
| 2009/0113803 | A1 * | 5/2009 | Arenz | 49/358 |
| 2009/0145182 | A1 * | 6/2009 | Bettin et al. | 70/237 |
| 2009/0199668 | A1 * | 8/2009 | Batosky et al. | 74/424.71 |

FOREIGN PATENT DOCUMENTS

| | | | |
|---|---|---|---|
| DE | 101 17 934 | | 10/2002 |
| EP | 0751278 | A1 | 1/1997 |
| GB | 599113 | | 9/1946 |
| GB | 837785 | | 8/1958 |
| JP | 2005282034 | A | 10/2005 |
| WO | 2005 005759 | | 1/2005 |

OTHER PUBLICATIONS

Machine Translation of DE 101 17 933, http://worldwide.espacenet.com/.*

International Search Report PCT/EP2007/060066: Dated Jan. 28, 2008.

* cited by examiner

DRIVE UNIT FOR ENTRANCE AND EXIT SYSTEMS

TECHNICAL FIELD OF THE INVENTION

The invention relates to a drive apparatus for boarding and unboarding devices, in particular for passenger doors, boarding ramps, retractable steps and the like on public transport vehicles having an electric drive motor the driven element of which is connected to the input element of a first reduction gear the output element of which is coupled to the actuation devices for the boarding and unboarding devices. Such type drive apparatuses are known per se.

BRIEF DESCRIPTION OF RELATED ART

A problem arising on such type drive apparatus is that, in an emergency case, it must be possible to open a passenger door manually or also to bring a retractable step or a boarding ramp manually into a certain position and that this is made more difficult by the fact that the drive apparatus has such a high self-locking phenomenon because of the high reduction ratio of the gear that manual movement is made extremely difficult.

BRIEF SUMMARY OF THE INVENTION

The invention provides a drive apparatus having the features such that manual operation is possible in an emergency case without self-locking of the reduction gear making this manual operation more difficult or impossible. More specifically, the drive apparatus is intended to be of a compact construction and to occupy little space.

A basic idea of the invention is to divide the overall reduction gear into two individual gears which are coupled together through a disengageable clutch, the first reduction gear being connected to the drive motor and the second reduction gear to the actuation devices for the boarding and unboarding device. The reduction ratios of the two reduction gears may then be chosen so that, after disengagement of the clutch, manual operation is possible against the now reduced self-locking phenomenon.

It has been found out that, up to a maximum reduction ratio of 25:1, the self-locking phenomenon of the clutch can be well overcome when operated manually. It appears therefrom that, when the overall reduction ratio of the two reduction gears ranges from 200:1 to 1400:1, the reduction ratios of the two reduction gears can be chosen such that the overall reduction ratio can be divided between the first and the second reduction gear by the energizable clutch so as to range between 2.5:1 and 0.5:1.

Planetary gears can be utilized as the gears for the first and the second reduction gears.

The energizable clutch can be configured to be a clutch that engages under the action of a spring and that is connected to a manually actuatable emergency unlocking device. It has further been found advantageous to dispose on the electrical drive motor an electromagnetically releasable brake, which acts by the action of a spring upon the driven shaft. Such type brakes are known per se under the name of "low-active brake".

Further, the output element of the second reduction gear can be connected to a lifting-rotating unit, which is a well-known component part utilized in particular in outward swing doors. By utilizing the lifting action, the door leaf interlockingly mates with the door portal through closing wedges.

In accordance with the invention, the entire drive device of the invention is built as a compact drive in which the electric drive motor, the first reduction gear, the energizable clutch and the second reduction gear are disposed axially behind each other inside a tubular housing.

In a particularly advantageous embodiment, the first reduction gear with the drive motor and the first clutch half are connected together axially by the action of a compression spring to the second clutch half and to the second reduction gear. The drive motor with the reduction gear is thereby displaceably carried in a tubular housing. In the case of an emergency, a Bowden cable tensions the spring and axially displaces the drive motor, the reduction gear and the clutch half in the outer tube so that the force transmission is interrupted at the clutch. In this embodiment, the construction at the clutch is very simple and can be realized with considerably less component parts. The outer diameter also remains much smaller since it is provided that the Bowden cable is attached centrally in the housing.

In both variants, the slim construction of the drive makes it possible to integrate it aesthetically anywhere on the door rotation post, which is also configured to be tubular. Thus, it is simply possible to place the drive depending on the given vehicle situation and on the connection possibilities so that space is made available for other components at the place where usually door drives were mounted such as in the roof region.

Herein after, two exemplary embodiments for a drive apparatus according to the invention will be explained in closer detail with reference to the appended drawings. In said drawings.

DETAILED DESCRIPTION OF THE INVENTION

Figure 1:
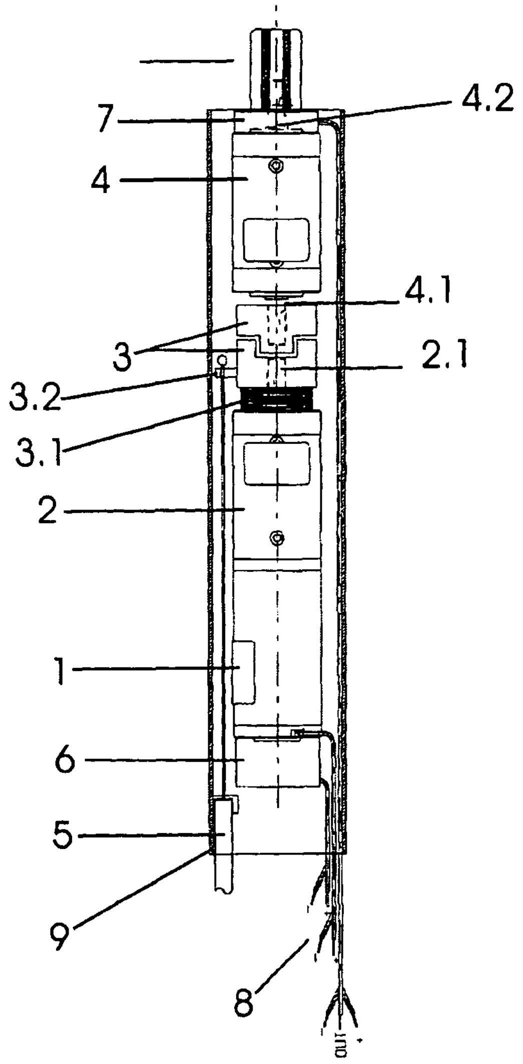
FIG. 1 shows a first embodiment of a drive apparatus for boarding and unboarding devices in a schematic axial sectional view.

FIG. 1 shows a drive apparatus built as a compact drive such as for a passenger door, wherein inside a slim, tubular housing, there are disposed one behind the other in an axial direction an electrical drive motor 1, a first reduction gear 2, an energizable clutch 3 and a second reduction gear 4. The driven element of the drive motor 1 is thereby connected to the input element of the first reduction gear 2 the output element 2.1 of which is connected to the input element 4.1 of the second reduction gear 4 through the clutch 3. The clutch 3 engages under the action of a compression spring 3.1. A clutch element has an actuation piece 3.2 for disengagement, which is connected to an emergency unlocking apparatus through a Bowden cable 5 in a manner that has not been illustrated herein; when said emergency unlocking apparatus is manually operated through the Bowden cable 5, the clutch 3 disengages against the force of the spring 3.1.

An actually known electromagnetically releasable brake 6, which engages under the action of a spring and which has not been illustrated in detail herein, is disposed on the electric motor 1.

Further, an apparatus 7 by means of which the rotation path of the output element 4.2 configured to be a driven shaft can be acquired is disposed on the output element 4.2 of the second reduction gear 4. This apparatus for sensing the rotation path can be configured to be an absolute encoder for example, but may also be an incremental encoder.

The output shaft 4.2 of the entire drive apparatus is connected to the actuation devices such as a passenger door in a manner that has not been illustrated specifically herein.

The electrical connection lines for the drive motor and the electromagnetically releasable brake introduced into the housing 9 as well as the signal line for the device for acquiring the rotation path are indicated generally with 8.

Figure 3:
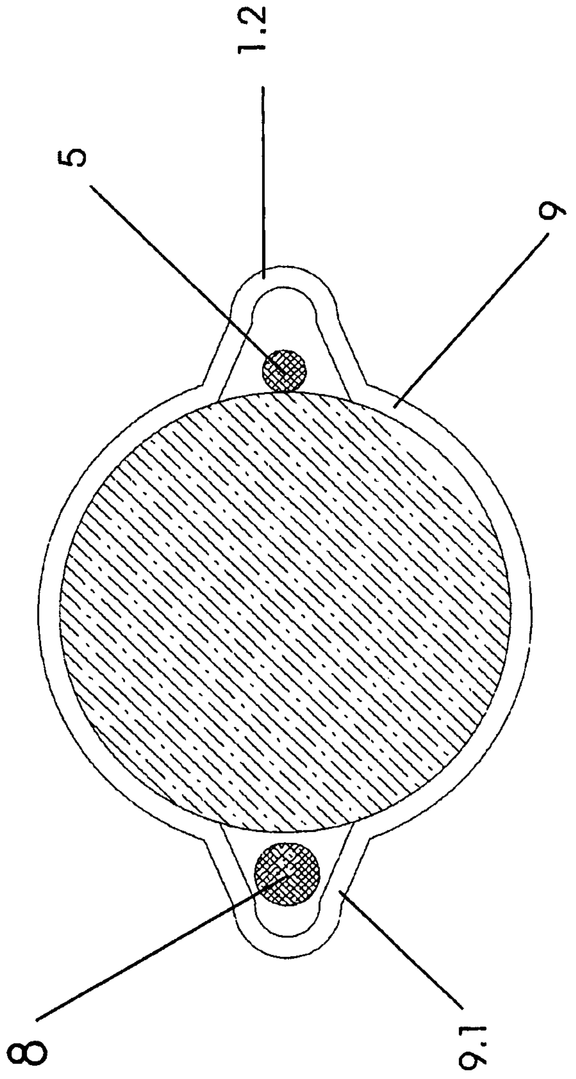
FIG. 3 shows the two embodiments shown in the FIGS. 1 and 2 in a top view when viewed from the bottom.

As can be seen from FIG. 3, the electric lines 8 and the Bowden cable 5 are disposed in channels that are arranged on the housing 9 as appended portions 9.1 and 9.2 respectively.

Figure 2:
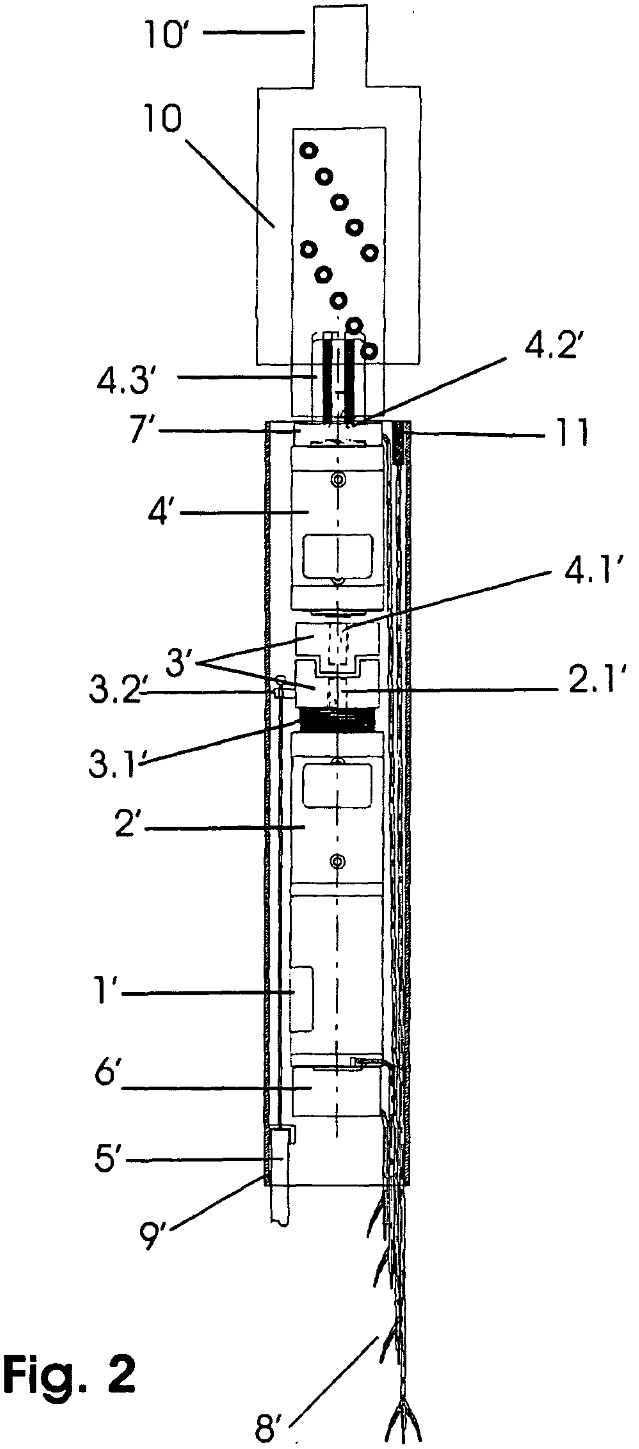
FIG. 2 shows a drive device with a lifting-rotating unit in an illustration analogous to FIG. 1.

FIG. 2 shows an embodiment of the drive device, which in principle is built in just the same way as the drive apparatus shown in FIG. 1. In FIG. 2, all the parts, which correspond to the discrete parts of the embodiment shown in FIG. 1, are identified by the same reference number with the addition of an invented comma. The only difference is that the actually known lifting-rotating unit 10, whose output element 10' is connected to the actuation devices for the passenger door, is connected to the driven shaft 4.3' of the overall drive device.

In the region of this driven shaft 4.3' there is additionally disposed a proximity switch 11 for acquiring the lift.

In principle, the functioning of the two embodiments shown in FIGS. 1 and 2 is the same. The torque generated by the drive motor 1 or 1' is transmitted to the output element 4.3 or 4.31 through the first reduction gear 2 or 2', the engaged clutch 3 or 3' and the second reduction gear 4 or 4'. In the case of an emergency, the clutch 3 or 3' can be disengaged through the Bowden cable 5 or 5' so that the passenger door can then be readily operated manually, against the self-locking phenomenon of the second reduction gear 4 or 4' only.

Figure 4:
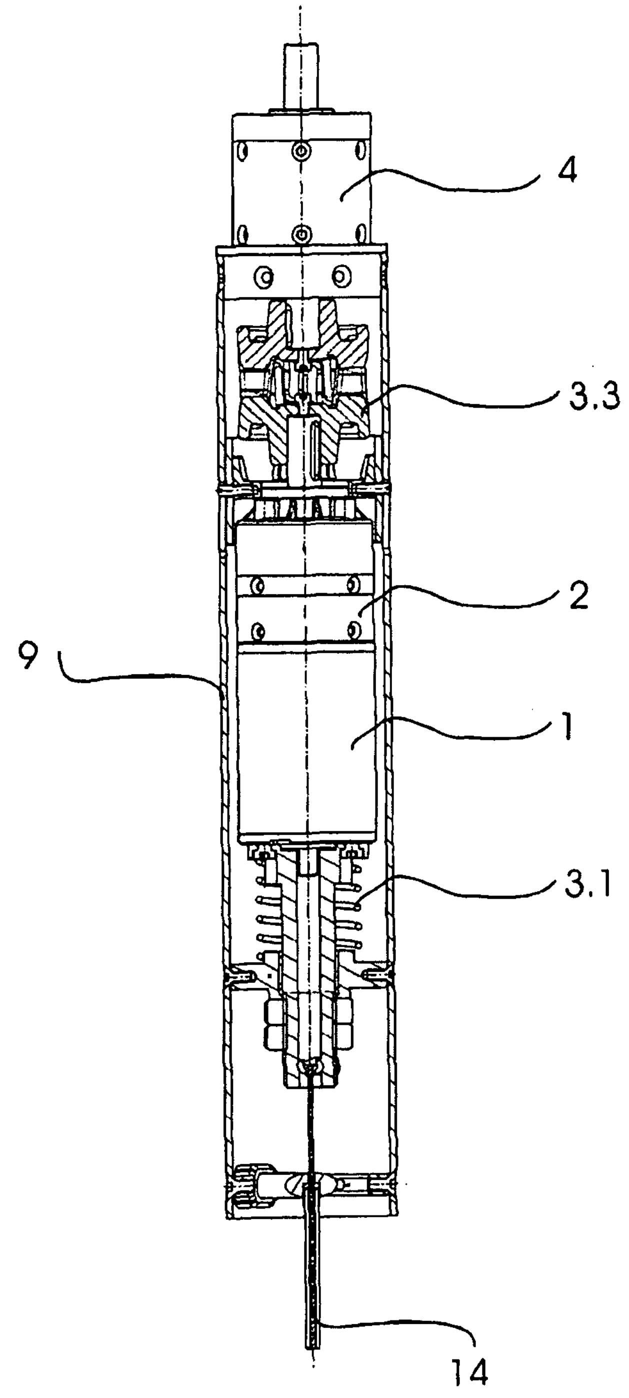
FIG. 4 shows a second embodiment of a drive device in closed position of the clutch in a schematic axial sectional view.
Figure 5:
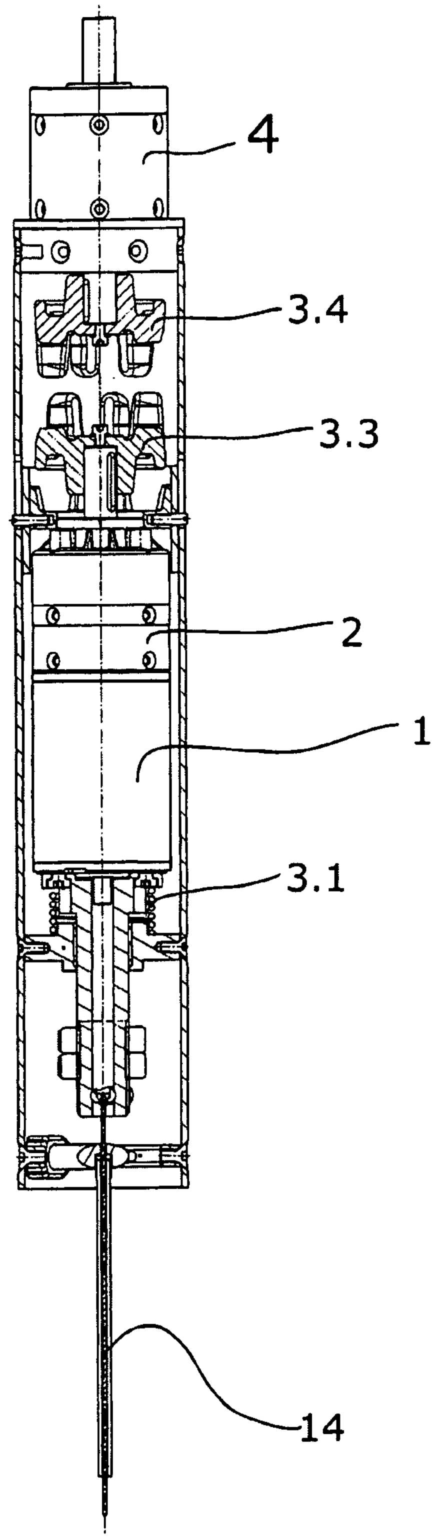
FIG. 5 shows the drive apparatus shown in FIG. 4 in open position of the clutch.

As contrasted with the first embodiment described, the FIGS. 4 and 5 show an embodiment in which the first reduction gear 2 with the drive motor 1 and the first clutch half 3.3 connected thereto are connected together axially to the second coupling half 3.4 and to the second reduction gear by the action of the compression spring 3.1. Together with the first reduction gear 2, the drive motor 1 is carried for displacement in the tubular housing 9. In emergency operation, a Bowden cable 14 tensions the compression spring 3.1 and axially displaces the drive motor 1, the first reduction gear 2 and the first clutch half 3.3 in the tubular housing 9 so that the force transmission at the clutch 3 is interrupted. In this embodiment, the construction at the clutch 3 is much simpler and can be realized with significantly less component parts. The outer diameter also remains much smaller since the Bowden cable 14 is attached centrally in the housing 9.

The invention claimed is:

1. Drive apparatus for entrance and exit systems comprising:

an electric drive motor with a driven element connected to an input element of a first reduction gear, the first reduction gear having an output element coupled to a plurality of actuation devices for the entrance and exit systems, wherein the electric drive motor, the first reduction gear and a second reduction gear and an energizable and disengageable clutch are disposed axially inside a tubular door rotation post, the clutch being disposed between the first reduction gear and the second reduction gear and the first reduction gear being disposed behind the electrical drive motor, wherein the energizable clutch is connected to a manually operable emergency unlocking device such that the energizable clutch is releasable between the first and the second reduction gear by operation of said emergency unlocking device to allow for manual operability of the entrance and exit systems in an emergency case without self-locking.

2. The drive apparatus as set forth in claim 1, wherein the maximum reduction ratio of the second reduction gear is 25:1.

3. The drive apparatus as set forth in claim 1, wherein the overall reduction ratio ranges from 200:1 to 1400:1.

4. The drive apparatus as set forth in claim 1, wherein the overall reduction ratio is divided between the first and the second reduction gear by the energizable clutch so as to range between 2.5:1 and 0.5:1.

5. The drive apparatus as set forth in claim 1, wherein the first and the second reduction gear are each configured to be a planetary gear.

6. The drive apparatus as set forth in claim 1, wherein the energizable clutch is configured to be a clutch that engages under the action of a spring.

7. The drive apparatus as set forth in claim 1, wherein the energizable clutch and the emergency unlocking device are connected through a Bowden cable.

8. The drive apparatus as set forth in claim 1, wherein an electromagnetically releasable brake, which acts upon the driven shaft by the action of a spring, is disposed on the electric drive motor.

9. The drive apparatus as set forth in claim 1, wherein an output element of the second reduction gear is a driven shaft the rotation path of which is acquired by a rotation sensor.

10. The drive apparatus as set forth in claim 9, wherein the output element of the second reduction gear is connected to a lifting-rotating unit.

11. The drive apparatus as set forth in claim 10, wherein the lifting motion of the lifting-rotating unit is sensed by a sensor.

12. The drive apparatus as set forth in claim 1, wherein the first reduction gear with the drive motor and the herewith connected a first component of the clutch are connected together axially, by means of the action of a spring, to a second component of the clutch and to the second reduction gear, said drive motor with the first reduction gear being carried for displacement in the tubular housing and a Bowden cable being disposed such that the action of the spring is overcome through said cable and that the drive motor, the first reduction gear and the first component can be displaced axially in the tubular housing so that the force transmission at the clutch is interrupted.

13. Drive apparatus for entrance and exit systems, comprising:

an electric drive motor with a driven element connected to an input element of a first reduction gear, the first reduction gear having an output element coupled to a plurality of actuation devices for the entrance and exit systems, wherein the electric drive motor, the first reduction gear and a second reduction gear and an energizable and disengageable clutch are disposed axially inside a tubular door rotation post, the clutch being disposed between the first reduction gear and the second reduction gear and the first reduction gear being disposed behind the electrical drive motor, wherein the energizable clutch is connected to a manually operable emergency unlocking device such that the energizable clutch is releasable between the first and the second reduction gear by operation of said emergency unlocking device to allow for manual operability of the entrance and exit systems in an emergency case without self-locking, wherein the first reduction gear with the drive motor and the herewith connected a first component of the clutch are connected together axially, by means of the action of a spring, to a second component of the clutch and to the second reduction gear, said drive motor with the first reduction gear being carried for displacement in the tubular door rotation post and a Bowden cable is connected to the emergency unlocking device and is disposed such that the action of the spring is overcome through said cable and that the drive motor, the first reduction gear and the first component of the clutch can be displaced axially in the tubular door rotation post against the force of the spring so that the force transmission at the clutch is interrupted.

* * * * *